United States Patent Office 3,389,903
Patented June 25, 1968

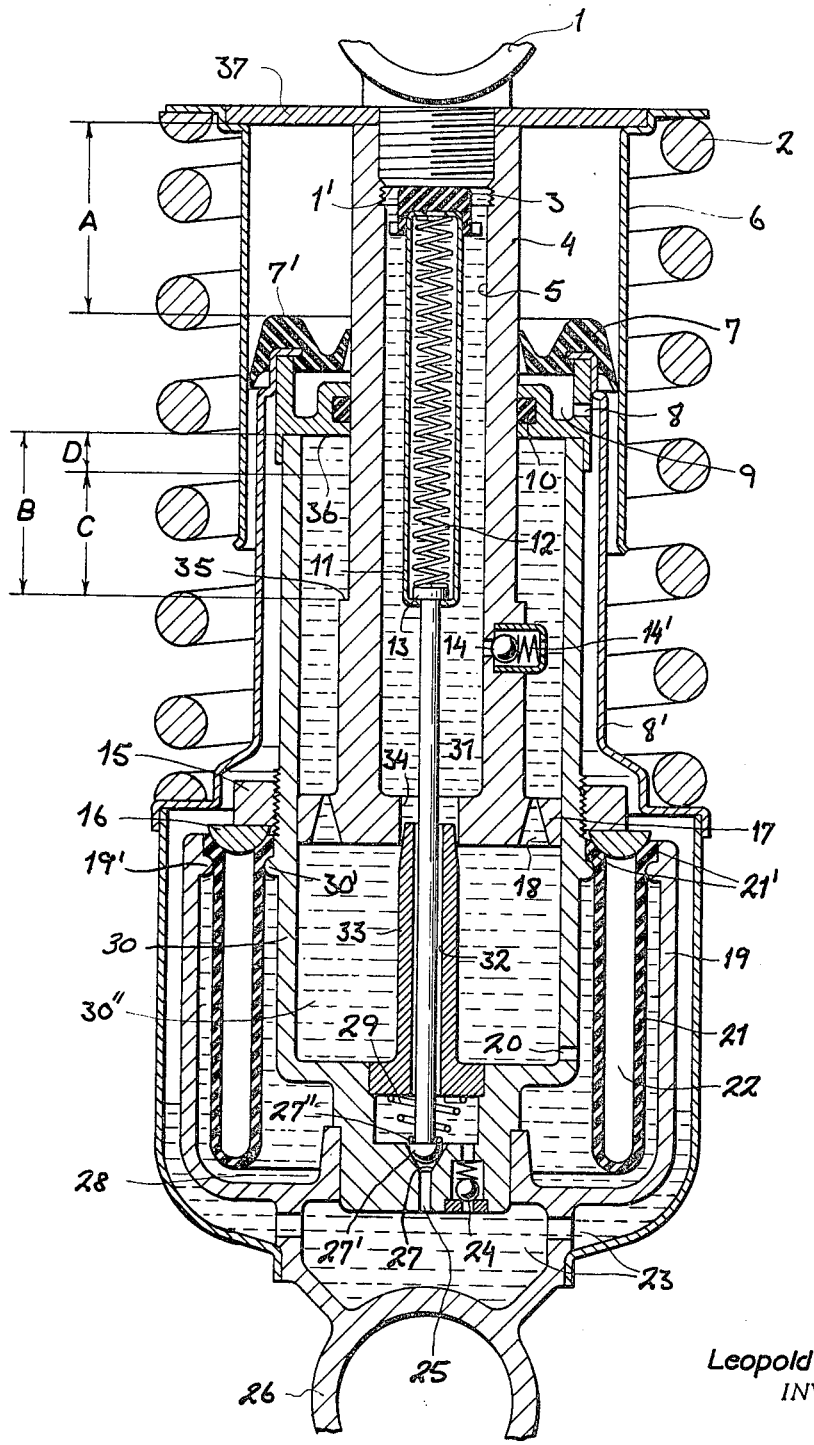

3,389,903
HYDRAULIC SHOCK ABSORBER FOR AUTO-
MOTIVE-VEHICLE SUSPENSIONS AND THE
LIKE
Leopold F. Schmid, Pischekstrasse 49,
Stuttgart, Germany
Filed Dec. 2, 1965, Ser. No. 511,039
Claims priority, application Germany, Dec. 2, 1964,
Sch 36,200
6 Claims. (Cl. 267—64)

ABSTRACT OF THE DISCLOSURE

Hydraulic shock absorber with a dashpot assembly whose cylinder, under conditions of reduced load, drains into a reservoir by way of a valve held closed by a first spring under normal or excess load; a second spring acting upon the valve yields to pressure of the hydraulic fluid at reduced loads but recloses the valve under very light loads as the liquid pressure in the dashpot cylinder, supplemented by the resiliency of a gas cushion, falls to a minimum.

My present invention relates to hydraulic shock absorbers having a gas cushion designed to resist the loading of the shock absorber and, more particularly, to a load-leveling shock absorber adapted to restore the chassis level or height upon the loading or unloading thereof to a substantially predetermined position with respect to the axles of the vehicle.

In my copending application Ser. No. 508,517, filed Nov. 18, 1965, I describe and claim a system whereby the hydraulic piston of a dashpot is displaceable within the cylinder of the latter and co-operates with a plunger for pumping hydraulic fluid to compensate for changes in the level of the chassis corresponding to increased loading or to decreased loading thereof. In this arrangement, I provide valve means for establishing the predetermined level of the chassis and thus the predetermined spacing of the cylinder and piston members of the dashpot.

It is the principal object of the present invention to extend the principles originally advanced in this copending application and to provide an improved hydraulic shock absorber with load-leveling capabilities for automotive vehicles and the like.

A further object of this invention is to provide a hydraulic shock absorber of the general character described which is of simplified construction, is reliable, and is automatically operable to re-establish a predetermined spacing of the relatively movable parts to which a shock absorber is connected, namely, the vehicle chassis and axle assembly.

Still another object of this invention is to provide a hydraulic shock absorber having pump means operated during the normal road movements of a vehicle, usually upon oscillation of the dashpot piston with respect to the cylinder, for re-establishing the predetermined positions of the piston and cylinder and having a gas cushion for equalizing the throttled flow of hydraulic fluid of the dashpot while serving simultaneously as an auxiliary gas spring for the height adjustment of the vehicle chassis.

I have now found that it is possible to overcome the disadvantages of prior-art devices for the automatic leveling (i.e. restoration of a predetermined chassis height) of a vehicle, namely, the poor control and the sealing problems involved in earlier devices, by providing a device in which a valve forms a control mechanism for regulating the flow of hydraulic fluid from the working chamber of a hydraulic dashpot to a reservoir. The present invention thus resides in a hydraulic shock absorber which comprises a dashpot arrangement wherein a hydraulic piston is displaceable within the working chamber of a shock absorber for the throttled flow of hydraulic fluid to damp the oscillations of the vehicle chassis and axle while such oscillations perform a pumping action to re-establish a predetermined relative position of the piston and the cylinder corresponding to the desired height of the chassis, valve means being provided for the control of efflux of fluid from the working chambers of the dashpot into a reservoir, the valve means being sealingly closed as long as the piston of the dashpot and the cylinder are telescoped together beyond their predetermined relative position mentioned above. The sealing closure of the valve is ensured, according to a specific feature of this invention, by a spring which is rendered effective by the movement of the piston into the cylinder (i.e. telescopic contraction) beyond the predetermined position, this spring being so dimensioned that it is rendered ineffective when the predetermined relative position of the piston and cylinder is again attained.

In addition to the spring action upon the valve stem in accordance with the position of the piston member, this spring being relievable and of interchangeable character with varying degrees of preloading, as described in my copending application mentioned above, I have found it to be desirable to provide a further spring for urging the valve stem in its blocking direction with a force so dimensioned that, shortly before the fully extended position of the dashpot assembly is attained (i.e. before the abutment or stop means establishing the maximum elongation engage), the efflux of hydraulic fluid from the working chamber of the cylinder member upon the dashpot to the reservoir surrounding same will also be blocked. In this case, drainage of fluid from the working chamber is prevented during periods of long stand in which the rest position of the chassis has a tendency to lower in the absence of the pumping action. By blocking the escape of fluid from the working chamber, there is no tendency of such settling to occur. Similarly, the tendency toward drainage of the working chamber is precluded when the chassis is jacked up and the shock absorber fully extended and unloaded during, for example, vehicle repairs.

According to a more specific feature of this invention, the working chamber of the dashpot acts upon a gas cushion or spring which resists telescopic contraction of the dashpot and is thus effective in aiding relationship with the pumping means to facilitate the re-establishment of the predetermined chassis height in addition to equalizing the fluid pressures during the dashpot action. This gas cushion can be formed by an elastically deformable annular receptacle of U-shaped cross-section with the arms of the U extending upwardly from its bight to produce a slender generally cylindrical upwardly open compartment; the walls of this compartment are formed at its mouth with lips or flanges which preferably overlie circumferentially spaced shoulders of the cylindrical member against which the lips are sealingly clamped by a downwardly curvilinearly convex sealing surface of a compression ring. A nut threaded onto the cylinder member urges this ring against the lips of the flexible-wall receptacle.

It will be apparent that the system of the present invention does not require any foreign source of energy to compensate for a fall in the level of the chassis and is capable of withstanding considerable loads because of the nature of the sealing arrangements. Moreover, the construction of the reservoir, control system and fluid passages is greatly simplified and indeed separate supply containers, control valves and piping systems are eliminated.

The above and other objects, features and advantages of the present invention will become more readily apparent from the following description, reference being made to the accompanying drawing, the sole figure of which is an axial cross-sectional view through a hydraulic shock absorber in accordance with the present invention.

In the drawing, I show a shock absorber for an automotive vehicle or the like which is provided with a lug 1 connectable with the chassis of the vehicle and carrying a seat 37 for a compression spring 2 which surrounds a hydraulic dashpot formed by a cylinder 30 and a piston 4. A cylindrical anticontamination shield 6 is fitted onto the seat 37 and is open downwardly and surrounds a rubber ring 7 forming a stop for the assembly in the fully telescoped position thereof. The rubber ring 7 is mounted upon a hydraulic cylinder 30 which is provided at its upper end with a fluid-escape bore 8 through which hydraulic fluid leaking from the cylinder chamber 30″ past a seal 10 can escape from a collection chamber 9 into a reservoir 23 surrounded by a casing 8′. The piston 4 is tubular and provided with an axially extending bore 5 receiving a spring cage or housing 11 having an elastomeric cushion 3 (e.g. of rubber) for reducing the noise produced by the cage 11 at a stop 1′ at the upper end of the assembly.

The cage 11 contains a prestressed, exchangeable axially extending compression spring 12 which is seated at the top of the cage and bears against a head 13 of a valve stem 31 axially shiftable within the cage 11 and forming at 27 a valve controlling the escape of hydraulic fluid from the working chamber 30″ of the hydraulic cylinder to the reservoir 23. A check valve 14 is mounted in the shank of the piston 4 and permits a unidirectional flow of hydraulic fluid from the interior 5 thereof to the working chamber 30. A spring 14′ bears against the ball check 14 for this purpose.

A pneumatic cushion 21 is formed with an upwardly open U-cross-section flexible compartment 22 which is closed at its upper end by a downwardly convex curved compression surface of a ring 16 clamped against the compartment 22 by a nut 15 threaded onto the outer wall of the cylinder 30. The lips 21′ of the flexible chamber are thus clamped against an annular bulge 19′ of an upwardly open cup 19 affixed to the cylinder 30 and against a similar bulge 30′ of the cylinder. The head 17 of the piston is provided with throttle bores 18 to form an oscillation-damping dashpot in the conventional manner. An aperture 20 at the base of the cylinder 30 establishes communication between the interior of the latter and the compartment 28 of the cup 19 while a check valve 24 is provided between the working chamber 30″ and the reservoir 23. A passage 25 leading from chamber 30″ to the reservoir 23 is occupied by a valve 27 which will be described in greater detail hereinafter. A frustoconical coil spring 29 urges the plunger 31 downwardly at its valve member 27′, this valve member being provided with projections 27″ preventing the blockage of the axially extending passage 32 in the pump plunger 33. The plunger 33 cooperates with an axially extending bore 34 in the head 17 to displace hydraulic fluid from the reservoir 23 into the working chamber 30″. A shoulder 35 on the shank of piston 4 cooperates with a stop surface 36 at the upper end of the hydraulic cylinder 30 to limit the elongation stroke B of the assembly while the surface 7′ of the ring 7 is engageable by the plate 37 to limit the compression stroke A thereof.

When the shock absorber is loaded, e.g., by the application of an upward force to the eye 26 connected with the wheel axle or by the increase of the load on the chassis connected to the lug 1, the assembly telescopes inwardly through a maximum distance represented at A to urge the piston 4 downwardly with respect to the cylinder 30 from its normal position illustrated in the drawing and corresponding to the predetermined relative position of the dashpot in the normal loaded stage of the vehicle and thus to the desired height of the vehicle chassis. Upon releasing of the wheel axle by a jacking up of this chassis, an unloading thereof or the passage of the vehicle over a hole in the driving surface, the piston 4 can move upwardly with respect to the cylinder 30 to a maximum distance B. Upon telescoping compression of the assembly against the force of spring 2, hydraulic fluid is displaced by the piston head 17 through the aperture 20 and compresses the gas cushion 22 within the elastically deformable receptacle 21. Since the plunger 33 of the pumping device for the automatic restoration of the level of the chassis extends into the bore 34 when the level of the chassis sinks because of additional loading (corresponding to a movement of the lug 1 in the direction of the lug 26), oscillation of the piston 4, 17 with respect to the plunger 33 causes a pumping displacement of hydraulic fluid from the reservoir 23 into the working compartment 30″ of the dashpot. The fluid is drawn from the reservoir 23 past the check valve 24 and flows along the bore 32 through the valve 14 and then into the dashpot chamber. This pumping action is maintained until the piston 4 is again in its predetermined normal position shown in the drawing. During this pumping action, the passage 25, by means of which the flow of hydraulic fluid from the working chamber 30″ to the reservoir 23 takes place, is sealingly blocked by the valve 27 because the spring 12 bears against the stem 31 of the valve head 27′. The spring cage 11 serves to prestress the spring valve so that any desired pressure can be maintained upon the stem 31. When the piston 4, 17 is below its predetermined normal position, the cage 11 is shifted downwardly to a corresponding degree so that the full force of spring 12 is applied against the head 13.

The prestressing of spring 12 is arranged to be of a magnitude sufficient that a complete sealing engagement of the valve 27 is effected. The spring 29 which bears upon the valve stem 31 in the same direction is so dimensioned that, when the shoulder 35 of the piston 4 is disposed within the axial range indicated at D and the spring 12 is no longer effective, the influx of fluid from the working chamber 30″ of the hydraulic dashpot into the reservoir 23 is also blocked. This spring 29 thus is effective to prevent, when the wheel axle is unloaded in, for example, a jacked-up position of the vehicle chassis for repairs, fluid from draining from the dashpot to the reservoir 23. In the range of axial movement represented by the distance C, however, in which the fluid pressure in compartment 30 is greater than in the aforementioned case, the spring 29 is partly compressed to form with the valve 27 a throttle or efflux-delay device for the passage of hydraulic fluid to the reservoir.

When the load is removed and the chassis level tends to rise above the predetermined level shown in the drawing, the cage 11 forms a stop for the head 13 and renders the spring 12 ineffective so that hydraulic fluid can drain from chamber 30″ to the reservoir, limited only by the throttle action of the valve, to re-establish the original level, as indicated. Oil leakages past the seal 10 are returned to the reservoir 23 is previously described and entry of dirt into the hydraulic system is prevented by the rubber ring 7 which acts as double seal, bearing upon the outer wall of the piston 4 as well as the inner wall of the cylindrical sleeve 6. The spring 2, of course, resists downward displacement of the chassis and thus supplements the air cushion 22.

The system described and illustrated is believed to admit of many modifications and variations within the ability of persons skilled in the art and all such modifications are considered to be included within the spirit and scope of the invention except as otherwise limited in the appended claims.

What is claimed is:

1. A hydraulic shock absorber for vehicular suspension systems and the like having two relatively movable parts whose relative movement is to be damped and which are to be maintained with a predetermined normal spacing with respect to one another, said shock absorber comprising:

a piston member connectible with one of said parts and a cylinder member connectable with the other of said parts and telescopingly receiving said piston member for forming a hydraulic dashpot having a working chamber;

pump means connected with said members and operable upon relative movement thereof for displacing hydraulic fluid from said reservoir into said chamber to re-establish a predetermined normal spacing of said parts;

valve means for controlling the flow of fluid from said working chamber to said reservoir and blocking the escape of fluid from said chamber to said reservoir in a relatively telescoped position of said members beyond said predetermined relative position thereof, said valve means including an axially extending valve stem;

and spring means acting on said stem for biasing said stem into a valve-closing position to block the escape of fluid from said chamber to said reservoir, said spring means being relievable at least in part upon elongation of said dashpot from said predetermined relative position of said members, said spring means including a first spring received in said piston member, a spring housing receiving said first spring and bearing upon said piston member upon telescoping displacement of said members inwardly beyond said predetermined relative position and slidably receiving said stem for applying the force of said first spring thereagainst, said housing engaging said stem at said predetermined relative position for rendering said first spring ineffective, said spring means including a second spring received in said cylinder member and urging said valve stem in valve-closing direction for blocking the escape of fluid from said chamber to said reservoir in an extended condition of said members beyond a predetermined limited extensibility of the dashpot constituting an ordinary range of extension, said second spring and said valve stem forming a throttle for the flow of fluid from said chamber to said reservoir within said ordinary range.

2. A hydraulic shock absorber for vehicular suspension systems and the like having two relatively movable parts whose relative movement is to be damped and which are to be maintained with a predetermined normal spacing with respect to one another, said shock absorber comprising:

a piston member connectable with one of said parts and a cylinder member connectable with the other of said parts and telescopingly receiving said piston member for forming a hydraulic dashpot having a working chamber;

pump means connected with said members and operable upon relative movement thereof for displacing hydraulic fluid from said reservoir into said chamber to re-establish a predetermined normal spacing of said parts;

valve means for controlling the flow of fluid from said working chamber to said reservoir and blocking the escape of fluid from said chamber to said reservoir in a relatively telescoped position of said members beyond said predetermined relative position thereof;

and flexible wall means forming a gas cushion communicating with said working chamber compressible upon telescoping contraction of said dashpot for resisting such contractions in aiding relationship with the operation of said pump means for facilitating re-establishment of the predetermined normal spacing of said parts, said flexible wall means forming an upwardly open annular receptacle of U-shaped cross-section, said cylinder member being provided with a pair of annular shoulders receiving said receptacle between them with respective lips of the receptacle bearing against said shoulders, said shock absorber further comprising a downwardly convex sealing ring seated against said lips from above and compressing said lips against said shoulders.

3. A hydraulic shock absorber for vehicular suspension systems and the like having two relatively movable parts whose relative movement is to be damped and which are to be maintained with a predetermined normal spacing with respect to one another, said shock absorber comprising:

a piston member connectable with one of said parts and a cylinder member connectable with the other of said parts and telescopingly receiving said piston member for forming a hydraulic dashpot having a working chamber;

pump means connected with said members and operable upon relative movement thereof for displacing hydraulic fluid from said reservoir into said chamber to re-establish a predetermined normal spacing of said parts;

valve means for controlling the flow of fluid from said working chamber to said reservoir and blocking the escape of fluid from said chamber to said reservoir in a relatively telescoped position of said members beyond said predetermined relative position thereof, said piston member including an axially extending tubular shank and a piston head at the bottom of said shank;

connecting means for securing the upper end of said shank to one of said parts, said piston head being formed with throttle bores for restricting the flow of fluid in said chamber to damp oscillation of said piston member within said cylinder member, said cylinder member being provided with an upwardly axially extending tubular plunger, said head of said piston member being formed with an axially extending aperture receiving said plunger and forming said pump means therewith;

a first check valve in said piston member for permitting a substantially unidirectional flow of fluid from the interior thereof to said working chamber, said working chamber communicating with said reservoir through the interior of said plunger, said pump means including a second check valve between said reservoir and the interior of said plunger for permitting a substantially unidirectional flow of fluid from said reservoir to said working chamber through said plunger, said valve means including a passage in said cylinder member establishes communication between the interior of said plunger and said reservoir and axially extending valve stem passing with clearance through said plunger into sealing relationship with said passage, said valve stem extending into the interior of said piston member and having a head therein;

first spring means within said piston member urging said stem into sealing engagement with said passage in telescoped positions of said members beyond said predetermined relative position;

a spring housing in said piston member for relieving said first spring means upon elongation of said dashpot beyond said predetermined relative position and engageable with said head of said stem;

and second spring means in said cylinder bore bearing upon said valve stem for urging same into blocking engagement with said passage in a substantially fully extended position of the dashpot to prevent draining of fluid from said working chamber to said reservoir.

4. A shock absorber as defined in claim 3 wherein said cylinder member comprises an upwardly open cup surrounding said working chamber and communicating therewith, said cup and said chamber being provided with circumferentially spaced shoulders extending toward one another at an upper end of said cup, a flexible-wall annular receptacle forming a gas cushion within said cup, said receptacle being a generally U-shaped cross-section and having inner and outer lips bearing against said shoulders, sealing means for closing the mouth of said receptacle, and sealing means including a downwardly convex ring compressing said lips against said shoulders, and a nut threaded onto said cylinder member for locking said ring against said lips.

5. An hydraulic shock absorber for vehicular suspension systems and the like having two relatively movable parts whose relative movement is to be damped and which are to be maintained with a predetermined normal spacing with respect to one another, said shock absorber comprising:
- a piston member connectable with one of said parts and a cylinder member connectable with the other of said parts and telescopingly receiving said piston member for forming a hydraulic dashpot having a working chamber;
- a reservoir for hydraulic fluid connected with said chamber;
- pump means connected with said members and operable upon relative movement thereof for displacing hydraulic fluid from said reservoir into said chamber to re-establish a predetermined normal spacing of said parts; and
- receptacle means communicating with said working chamber and forming a gas cushion for resisting contraction of said dashpot and thereby acting in aiding relationship with said pump means to reestablish said predetermined normal spacing of said parts, said receptacle having flexible walls and being of generally U-shaped cross-section and of annular configuration, said cylinder member being provided with sealing means for closing said receptacle, said cylinder member comprising a central cylinder forming with said working chamber an upwardly open cup surrounding said central cylinder and communicating therewith, said cup and said central cylinder being provided with circumferentially spaced shoulders extending toward one another at the upper end of said cup, said receptacle having at its mouth inner and outer lips bearing against said shoulders, said sealing means including a downwardly convex ring with a curved compression surface engaging said lips and a nut threaded onto said central cylinder for compressing said surface against said lips for locking said ring thereagainst.

6. A shock absorber as defined in claim 5 further comprising valve means for controlling the flow of fluid from said working chamber to said reservoir and blocking the escape of fluid from said working chamber to said reservoir in a relatively telescoped position of said member beyond said predetermined relative position thereof.

References Cited
UNITED STATES PATENTS 3,033,556 5/1962 Wossner.
3,083,026 3/1963 Broadwell.

ARTHUR L. LA POINT, *Primary Examiner.*

R. M. WOHLFARTH, *Assistant Examiner.*